United States Patent Office 2,755,390
Patented July 17, 1956

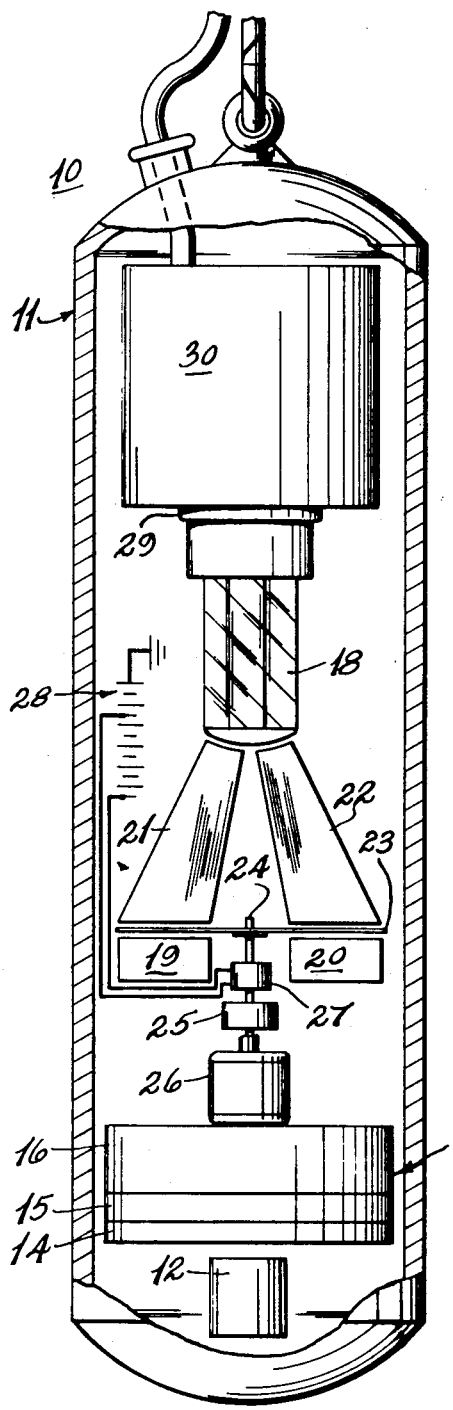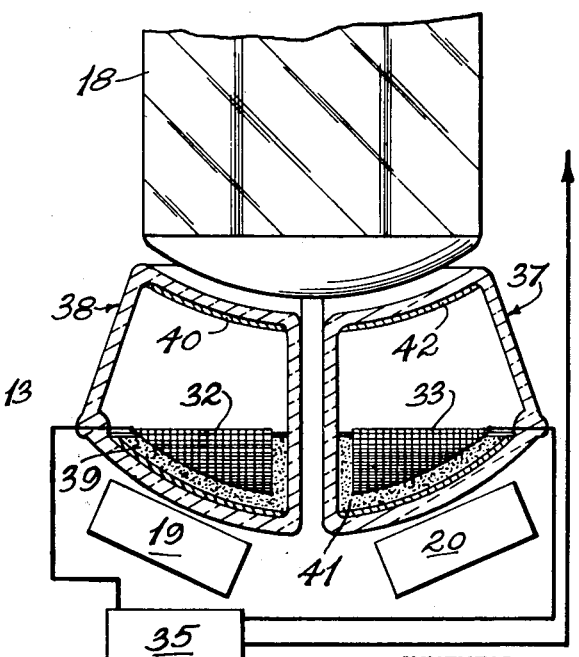

2,755,390

DETECTION OF MIXED RADIATION

Charles F. Teichmann, Crestwood, N. Y., assignor to Texaco Development Corporation, New York, N. Y., a corporation of Delaware Application August 6, 1952, Serial No. 302,882

15 Claims. (Cl. 250—71)

This invention relates to improvements in detectors which are capable of indicating separately, as for purposes of comparison, the individual flux densities of radiation of different kinds and/or intensities simultaneously permeating the same volume of a space under examination. More particularly it relates to improvements in types of such detectors intended for use in geophysical exploration such as in logging a bore hole.

Two extreme alternative procedures are presently available for such individual detection of mixed radiations. On the one hand one may use separate detectors each of which is selectively responsive to a different kind and/or intensity of radiation, and may then collate the separate portions of the total information relating to the common "source" after they have been individually obtained from the separate detectors. Or, on the other hand, one may use a single detector which is actuated by all of the different kinds and/or intensities of radiation, such as by hard gammas, neutrons, soft gammas, etc., and may thereafter, and prior to collating the information, separate the respective pulse signals which are provided by the detector in response to said different kinds and/or intensities of radiation. The first procedure has the following disadvantages: (1) it takes more time than a simultaneous procedure; (2) accurate collation will not be possible unless the selective detectors employed for measuring the different kinds of radiation emanating from a common source were each accurately positioned thereat in its turn; and (3) accurate collation will not be possible at all in situations in which it is possible for some of the radiation to change in intensity with the passage of time, e. g., residual induced radiation which remains after removal of the source which produced it. The second procedure also has a number of disadvantages, most of which derive from the difficulty of obtaining dependable circuits for separating pulse signals which often are only slightly different from one another in any of their characteristics such as in their amplitudes, particularly where one is seeking to separate them into several as distinguished from, say, only two groups. Accordingly there exists a need for detection procedures of the kind in question which are free of the disadvantages of either of those mentioned above and for apparatus required for carrying out the procedures.

The disadvantages which are mentioned above are particularly troublesome where measurements of radiation are to be effected in a bore hole for the purpose of geophysical exploration. Consider the case of a logging procedure in which separate runs are made with two tools, one which contains a source of fast neutrons and a gamma ray detector and is moved through a bore hole to log the intensities of induced gamma radiation along the length thereof and another which contains a similar source and a detector of thermal neutrons and is similarly moved therethrough to determine the intensities of the induced thermal neutrons therealong. Whether data is taken (e. g., recorded) while the logging tool is being lowered or raised in making these runs errors will arise which will make it impossible ever to effect accurate collation of the two logs after they have been separately obtained. For example, where the data is taken as the tool is lowered inaccuracies will arise as to the positionings of depth marks made at successive points along the log chart by the use of a device which is responsive to increments of cable length as they are payed out. The reason for this is that the logging tool will not necessarily always be at a distance below the surface which is accurately related to the amount of cable which has been payed out. Despite the considerable combined weight of the tool and the cable supporting it, their descent is frequently impeded by conditions such as the occurrence of "heaving shales" (which reduce the size of the bore hole) and failure of the bore to proceed along a straight vertical axis. As a result a considerable amount of cable can be fed down into the bore hole without the tool descending by an equivalent amount. If the inaccuracies incurred in this way in the two runs are not exactly the same, and ordinarily they will not be, then it will be impossible properly to collate the respective data obtained thereby. For this reason data frequently is taken while the tool is being raised rather than lowered. However, while this may reduce the magnitude of such inaccuracies, it will not eliminate them. This is due to the elasticity of the great lengths of cable which are involved in such an operation. Thus when the tool binds in the bore hole and considerable lengths of the cable drag along its side the cable may stretch to a very substantial degree before the tool begins to move freely again.

Because of this it is quite desirable, if possible, to take any desired various kinds of data during a single logging run and with a single composite tool. However this will necessitate enlarging the tool so that it can accommodate a plurality of detectors. For example, it may be enlarged longitudinally so that the necessary number of detectors can be located at different positions along its length with predetermined spacings between them which can be taken into consideration when collating their output data, such as the arrangement disclosed in copending application 157,903, now abandoned. While this type of logging tool provides a satisfactory solution for the problem of collating multiple-log single-run data, it is not ideally suited to some multiple-log procedures, such as ones including "neutron-gamma" and "neutron-neutron" logging. In this type of logging, in which it is sought to determine the relative flux densities of thermal neutrons diffusing back to the detector from adjacent earth solids after originating as fast neutrons projected from a source thereof carried in the logging tool and of gamma radiation induced by the absorption by some of said thermal neutrons by hydrogen-containing elements in said solids, it is very desirable that both of the detectors be in close juxtaposition to the fast neutron source. This will be impossible if they must be located at opposite ends of an elongated logging tool, particularly if the detectors must be quite long themselves to have outputs of useable magnitudes, e. g., like the typical Geiger-Mueller tubes used for well-logging, whereby the tool must be very, very substantially elongated to be able to accommodate them.

Another way of enlarging the tool so that it accommodates a plurality of detectors is to increase its diameter. However, since there is a maximum for this dimension which cannot be exceeded if the tool is to be useable in a standard size bore hole, it sometimes will not be possible to attain a side-by-side arrangement for the detectors without reducing their diameters in addition or in lieu of increasing that of the tool. In the case of Geiger-Mueller detectors this may be quite disadvantageous. As is known this type of tube must have a fairly substantial volume if its output pulse occurrence rate is to be of a useable magnitude, and, for well-logging purposes this substantial volume should result from its being fairly large in diameter rather than in length since excessive extension of its latter dimension will reduce its ability for detecting anomalies which may characterize a relatively thin earth-solids stratum.

From the foregoing analysis it follows that a very desirable arrangement would be one in which a single logging tool would contain a plurality of side-by-side detectors of a type which inherently have such high counting efficiencies that they can have outputs of useable magnitudes even if they are made small enough to permit the desired geometrical arrangement in a tool which is small enough to fit within a bore hole. Detectors which have the highest efficiencies and therefore come nearest to satisfying this requirement are scintillometers. However as is known, the performance, e. g., the gain, of their photo-multiplier tubes can be quite unstable whereby their counting rates are subject to marked variation as a result of such influences as changes in the potentials which are applied to the multiplier-tube dynodes; spurious magnetic fields; and changes in ambient temperature. Therefore it is not safe to depend on the comparability of collated data obtained in a multiple-logging run with a plurality of scintillometers each employing its own photo-multiplier tube inasmuch as these random variations in their individual outputs will not necessarily occur in unison, in the same directions, and/or in corresponding magnitudes even if the influences which brought them about are common to all of them.

Because of this it is one of the features of the present invention to employ the same photo-electron multiplier for a plurality of side-by-side scintillometer detector heads, i. e., luminophors. This arrangement makes it possible to avoid above alluded-to disadvantages of using a single detector which is sensitive to a variety of kinds and/or intensities of radiation in combination with circuits for sorting out pulses which are respectively attributable thereto. To this end it is another feature of the present invention to use luminophors which are differently responsive to penetrative radiation and to effect cooperation of the single photo-electron multiplier tube with the plurality of luminophors on a time-sharing multiplex basis. One way in which this kind of cooperation can be effected is to first permanently couple each of the luminophors to a part of the cathode of the photo-multiplier tube and thereafter, in operation, to sequentially expose the respective luminophors to the mixed radiations one at a time, for example, by the use of a resolving shutter-shield. Since an essential characteristic of most of the mixed radiation in question is that it is highly penetrative, suitable shutters for this purpose must necessarily include dense thick elements which therefore are heavy and cumbersome and difficult to move at a high rate of speed. Because of this this is not the preferred way of effecting this kind of cooperation. Two better ways are made possible by the fact that a scintillometer, as intermediate steps in converting penetrative radiation into electrical pulses, converts it into scintillations and photo-electrons. Accordingly one convenient way of effecting time-sharing cooperation is to have one or more mechanically driven shutters, interposed between the luminophors and the cathode of the photo-electron multiplier tube to control the transfer of (non-penetrative) light therebetween, which can be of very light weight and therefore amenable to very rapid movement. Another way is to use electrical gating to control the utilization of the photo-electrons for the production of output electrical pulses.

In the drawing:

Fig. 1 is a schematic representation of a longitudinally sectioned logging tool containing an embodiment of the present invention;

Fig. 2 represents a fragmentary portion of a modification of the embodiment of Fig. 1 showing in particular the modified portions; and Fig. 3 represents a fragmentary view of another modification of the embodiment of Fig. 1 also showing in particular the modified portions.

The logging tool 10 shown in Fig. 1 comprises an hermetically sealed tubular envelope 11 of any suitable material such as stainless steel. Within the envelope 11 near its bottom end is a source of fast neutrons 12 such as one comprising a mixture of pulverized radium and beryllium. A shield 13 is carried within the envelope 11 immediately above the source 12 to prevent direct radiations emitted thereby from reaching the detection apparatus. If the source 12 emits other kinds of radiation than fast neutrons it will be necessary for the shield 13 to be a composite type which is capable of absorbing all of them. For example, if the source 12 shown herein is of the radium-beryllium type, i. e., if it emits gamma rays as well as fast neutrons, then an appropriate shield 13 for the tool 10 will be one of the kind which is described in copending application, Serial No. 248,760, filed September 28, 1951, namely one comprising a layer (14) of paraffin for converting fast neutrons into thermal neutrons; a layer of boron (15) for absorbing the thermal neutrons; and a layer of lead (16) for absorbing gamma radiation. The detection apparatus for the tool 10 is carried in the portion of its envelope 11 above the shield 13 and comprises a common photo-multiplier tube 18, two luminophors 19, 20 and respective light pipes 21, 22 for coupling each of the luminophors to a different portion of the cathode of the photo-multiplier tube 18. Interposed between the luminophors 19, 20 and the light pipes 21, 22 is a rotatable circular shutter 23 appropriately cut out (in a manner which does not appear in the side view of the shutter 23 as it appears in Fig. 1) so that in an appropriate rotational position it can block the light transmission path from one of the luminophors to its associated light pipe, while leaving unimpeded the corresponding path between the other luminophor and its associated light path, and can do the converse when moved through a predetermined number of degrees, such as 180, to another rotational position. The shutter 23 is mounted on the output shaft 24 of a driving mechanism 25 which contains a Geneva wheel arrangement (not shown) for translating rotational motion of constant angular velocity into intermittent rotational motion. The mechanism 25 is driven by an electric motor 26 such as a synchronous A. C. motor.

It will be readily seen that as a result of this arrangement the luminophors 19, 20 will be alternately coupled to the photo-multiplier tube 19 at a predetermined cyclic rate. A commutator switch 27 is also mounted on the shaft 24 so that in synchronism with successive intermittent angular movements of the shutter 23 it will alternately apply two control voltages from a D. C. source 28 to an element in the output circuit of the photo-multiplier tube 18 in a manner to be more fully described below. The photo-multiplier tube 18 is represented as being directly plugged into a socket 29 as a means of connecting its various terminal pins to appropriate circuit points of its power supply, preamplifier, linear amplifier, pulse amplitude discriminator, etc., all of which are represented together by the block 30 in Fig. 1. The details of these electrical components, connections and circuit points are not shown herein since the ones which will be fully appropriate are well-known in the art.

One of the luminophors 19, 20 may be of a type containing a substance, such as boron, which converts thermal neutrons into charged particles, such as alpha particles, which are capable of exciting luminescence. As a result not only will this luminophor be able to convert thermal neutrons into scintillations, a thing which most luminophors can not do, but in addition it will do so so effectively that these scintillations will be larger than those produced by many other types of radiation such as induced gamma rays. Because of the exceptionally large light content of the thermal neutron induced scintillations the electrical pulses into which the photo-multiplier tube will convert them will have exceptionally large amplitudes. Therefore they can be readily separated from the other pulses moving through the output circuits of the detector apparatus simply by using an appropriate, and in this case relatively high, threshold voltage for biasing the grid of a discriminator tube included in those circuits for this purpose, e. g., a relatively large negative cut-off voltage which can be overcome only by the largest output pulses (the thermal neutron induced ones) when all of them are applied thereto in positive-going polarity. To this end the commutator 27 is arranged to connect the more negative one of two voltage take-off points of the source 28 to an input of the block 30, which in turn is connected to the grid of the discriminator tube, doing so for each time interval, in the time-sharing multiplex operation afforded by this apparatus, during which the neutron responsive luminophor is effectively coupled over its associated light pipe to the photo-electron multiplier tube.

The other luminophor may be one of several well-known kinds which is highly responsive to gamma rays but is not responsive to neutrons. During intervals when this luminophor is employed it will be unnecessary to use pulse amplitude selective circuits for rejecting neutron induced pulses since no such pulses will be present. The advantage in this type of arrangement is that any possibility of circuit error or malfunction is eliminated as a problem. However, due to the absence of thermal neutron induced pulses it will become easily possible to select the next largest pulses, i. e., the largest ones which are produced, if any advantage is to be gained by so doing. These will be the pulses attributable to neutron-induced gamma rays as distinguished from natural gamma rays and the back-scattered gamma ray component of the radium in the radium-beryllium source 12. Thus if the commutator arrangement 27 is set up and adjusted to apply an appropriate somewhat lower threshold voltage to the block 30 during intervals when the second luminophor is coupled to the photo-multiplier tube it will be possible to select these pulses and to reject all the others.

While the principles of the present invention have been illustrated herein with a detection apparatus comprising only two luminophors, which two luminophors are suitable for "neutron-neutron" and "neutron-gamma" types of logging, it is to be understood that neither the number of luminophors nor their types need to be thus limited. Accordingly, for example, it is possible to embody this invention in apparatus for conducting simultaneous neutron-neutron and natural-gamma logging runs if desired. In such a case the output circuits should be effective, during intervals when the non-neutron responsive luminophor is the one which is coupled through to the photo-multiplier tube, to suppress the pulses attributable to neutron-induced gamma rays rather than to select them. To this end the output square wave from the commutator 27 may be utilized as above described for selecting the pulses attributable to neutron-induced gamma rays, while at the same time and in addition, it may be used to enable suitable circuitry for using these thus-selected pulses to perform a switching-off function in a gating tube so as to block their own time intervals, whereby, in effect they reject themselves in a channel carrying all of the output pulses of the photo-multiplier tube but in so doing do nothing to prevent all of the other pulses from passing through the gate tube to the output of the apparatus.

Thus it is seen that the apparatus shown in Fig. 1 has the improved reliability and capability of separating pulses attributable to different kinds and/or intensities of radiation that can be attained by the use of separate detectors having discrete types of luminophors and particular circuits and circuit adjustments, while at the same time it has the additional advantage of being effectively able to detect the various kinds and/or intensities of radiation in a single run with the assurance that data which is to be collated is properly comparable as having originated in the same space and at the same time.

While only two luminophors have been shown in Fig. 1, this being done primarily for the purpose of simplifying the drawing and the description, it is intended to be understood, as has already been indicated above, that the present operation can be embodied in forms of apparatus in which several more, or even several times as many, detector heads are employed in cooperation with each single photo-multiplier tube.

The embodiment of Fig. 2 is one type of "all electronic" modification of the Fig. 1 apparatus. It employs a modified electron multiplier tube 18' in which a plurality of gating grids 32, 33 are mounted adjacent respective areas of the exposed active surface of the tube's photo-cathode 34, each of which (area) is allotted to a different one of the luminophors 19, 20. A square wave generator 35 applies respective trains of interleaved negatively-going square waves to the grids 32, 33 to alternately suppress any photoelectron emission from the areas of the cathode 34 which they control. Thus, even though both of the luminophors 19 and 20 may be continuously producing scintillations and irradiating the cathode 34 with light therefrom, yet in a given one of the multiplexed time channels only photo-electrons which are emitted by the cathode 34 in response to scintillations from a predetermined one of the luminophors will be able to enter the field of the first dynode of the multiplier tube so that they can eventually become effective to produce an output pulse. If desired the amplitudes of the positive-going portions of the wave trains provided by the source 35 may be such that in combination with the D. C. biases employed for the gating grids 32, 33 they will not attain the same potential as the cathode 34 nor exceed this potential in a positive direction when they are gated-on but rather will even then be sufficiently negative with respect to the cathode to have a velocity filtering action, like that taught in copending application Serial No. 85,174, filed April 2, 1949, now U. S. Patent No. 2,702,-865 for rejecting unwanted thermal emission from the photo-cathode 34. When the gating grids 32, 33 are thus employed each will have two functions, namely one as a velocity filter for reducing the dark current in the multiplier tube and another as a gate for causing the apparatus to operate on a time-sharing multiplex basis.

In the embodiment of Fig. 3 the gating grids 32, 33 are built into respective light-coupling light amplifier tubes 37, 38 instead of into the photo-multiplier tube. It may be preferred to practice the invention in this way where it is not convenient to build in its entirety the required special type of photo-electron multiplier tube and/or where it is desired to use light amplification in accordance with the teachings of copending application Serial No. 301,019 filed July 26, 1952.

Photo-cathodes and fluorescent targets for the light amplifier tubes 32 and 33 are respectively shown in Fig. 3 at 39, 40 and 41, 42.

While in each of the illustrative embodiments herein the respective luminophors happen to be shown coupled to discrete areas of the cathode of a photo-multiplier tube, it is not essential that this be done in order to practice the present invention. For example, the Fig. 1 embodiment could be modified, if desired, so that the luminophors are mounted on a revolving carrier, e. g., on a plate which is rotated by the shaft 24 and so that the photo-multiplier tube occupies a position like that of one of the light pipes 21, 22 whereby all of the surface of its photo-cathode will be in juxtaposition to the output surface of each of the luminophors as it comes into position. Or, if desired, the mechanically moving element, instead of comprising a shutter or the luminophors, may be a mirror or prism which in each successive time interval couples all of the output area of one luminophor to all of the surface of the photo-cathode of the photo-multiplier tube.

While the photo-electric devices 18 shown herein are all of the secondary-emitter electron multiplier type it is to be understood that this is not essential for the successful practice of the present invention. This type of device has been shown as suitable because it can perform two essential functions: (a) it can convert light into electrons; and (b) it can greatly multiply the number of these electrons to produce sizable output electrical pulses. Since photo-sensitive Geiger-Mueller tubes, such as those described in copending application Serial No. 138,341, filed January 13, 1950, now U. S. Patent No. 2,694,152 are also capable of performing these two essential functions, these Townsend avalanche gas-amplifier tubes may be used in many embodiments of the present invention in lieu of multiple-stage secondary emitter types of tubes.

Obviously, many modifications and variations of the invention, as hereinbefore set forth, may be made without departing from the spirit and scope thereof, and therefore only such limitations should be imposed as are indicated in the appended claims.

I claim:

1. Radiation detection apparatus comprising a high gain photo-electric device having a cathode which is capable of emitting a group of photo-electrons in response to irradiation with an impulse of a light in a predetermined spectral range and means capable of attracting said electrons away from the cathode and multiplying the number thereof to produce a sizable electrical pulse as a useful output signal; a plurality of closely-grouped-together luminophors disposed substantially side by side and having discrete capabilities for converting penetrative radiation into light within said range; and means for periodically enabling said photo-electric device to be responsive during non-over-lapping, sequential intervals and on a time-sharing multiplex basis to samples of the light emitted by respective ones of said luminophors to produce useful output signals in accordance therewith.

2. Apparatus as in claim 1 in which a light output surface of each of said luminophors is optically coupled to a respective portion of said cathode over an individual light transmission path thereto, and said enabling means includes shutter means adapted to be placed in a plurality of positions, during said intervals in each of which it blocks all but one of the transmission paths between said luminophors and said cathode and between said intervals to block substantially all of said paths and means for moving said shutter means to place it successively in respective ones of said positions in a cyclically repeated and predetermined sequential order.

3. Apparatus as in claim 2 in which at least two of said luminophors are in alignment along a most probable approach-pathway of a principal portion of the radiation to be detected and a light-guiding element, such as a light pipe, extends along part of the individual transmission path between the output surface of at least one of the luminophors and the respective portion of said cathode to which it is coupled.

4. Apparatus as in claim 1 in which a light output surface of each of said luminophors is optically coupled to a respective portion of said cathode, said enabling means comprising a plurality of gating grids positioned adjacent different parts of the emissive surface of said cathode corresponding to the portions thereof to which the respective luminophors are coupled, and each of the grids is responsive to one electrical polarization to prevent the means first-mentioned in claim 1 from effectively attracting said photo-electrons away from the said cathode and to another electrical polarization to permit it to attract them away.

5. Apparatus as in claim 1 which further comprises a plurality of light amplifier tubes and in which a light output surface of each of said luminophors is coupled to a respective portion of said cathode by a different one of said light amplifier tubes, and said periodically enabling means comprises a gating grid in each of the light amplifier tubes for enabling or preventing the movement of photo-electrons therein from its photo-cathode to its fluorescent target.

6. Radiation detection apparatus comprising a photo-multiplier tube, a plurality of closely-grouped-together luminophors disposed substantially side by side and each having a different responsiveness for converting penetrative radiation into light within a range to which the multiplier tube is responsive, a light output surface of each of said luminophors which is optically coupled to the cathode of the photo-multiplier tube over an individual light transmission path thereto, and means for individually and periodically enabling the effective transfer of light from said luminophors to said multiplier tube during non-over-lapping, sequential intervals on a time-sharing multiplex basis.

7. Apparatus as in claim 6 in which said last-mentioned means comprises a mechanically intermittently driven element for cyclically physically altering at least one characteristic of each of said transmission paths.

8. Apparatus as in claim 6 in which each of said surfaces is coupled to said cathode over a normally disabled light amplifier tube and said last-mentioned means comprises electronic means for enabling the amplifier tubes one at a time in a cyclically repeated and predetermined sequential order.

9. Radiation detection apparatus comprising a photo-electron multiplier tube having a plurality of gating grids adjacent respective portions of its photo-cathode, and a plurality of luminophors each having a different responsiveness for converting penetrative radiation into light and each having a light output surface which is optically coupled to a respective one of said portions of the photo-cathode.

10. Apparatus as in claim 9 and further comprising a source of interleaved trains of electrical square waves, and means for applying the respective trains to said gating grids.

11. Apparatus as in claim 10 and further comprising output circuitry for the multiplier tube which includes a pulse amplitude discriminating means and means for applying to said last-mentioned means a threshold voltage which changes periodically in synchronism with the periodicity of the square waves in said trains.

12. A bore hole logging tool comprising an hermetically sealed envelope containing radiation detection apparatus comprising a high gain photo-electric device having a cathode which is capable of emitting a group of photo-electrons in response to irradiation with an impulse of a light in a predetermined spectral range and means capable of attracting said electrons away from said cathode and multiplying the number thereof to produce a sizable electrical pulse as a useful output signal; a plurality of closely-grouped-together luminophors having discrete capabilities for converting penetrative radiation into light within said range; and means for periodically enabling said photo-electric device to be responsive during non-over-lapping, sequential intervals and on a time-sharing multiplex basis to samples of the light emitted by respective ones of said luminophors to produce useful output signals in accordance therewith.

13. A tool as in claim 12 which further comprises a source of fast neutrons for irradiating earth formations surrounding the bore hole, means for shielding said apparatus from direct radiations emitted by said source, and in which said luminophors include one which is responsive to thermal neutrons and at least one other which is unresponsive thereto.

14. Radiation detection apparatus comprising a high gain photo-electric device having a cathode which is capable of emitting a group of photo-electrons in response to irradiation with an impulse of light in a predetermined spectral range and means capable of attracting said electrons away from the cathode and multiplying the number thereof to produce a sizable electrical pulse as a useful output signal; a plurality of closely-groupedtogether luminophors having discrete capabilities for converting penetrative radiation into light within said range, their capabilities being discrete both as to the kinds of radiation which they can respectively convert and the intensity levels of the light which they thus produce; means for periodically enabling said photo-electric device to be responsive during non-over-lapping, sequential intervals and on a time-sharing multiplex basis to samples of the light emitted by respective ones of said luminophors to produce useful output signals in accordance therewith; output circuitry for the photo-electric device including signal-amplitude-responsive discriminator means for selecting some signals which are intermixed with others; and means for applying to said discriminator means a threshold voltage for controlling the action thereof which voltage changes in magnitude in a predetermined manner in synchronism with said periodic enabling.

15. The method of analyzing earth constituents comprising the steps of irradiating the constituents with penetrative radiation to cause the conversion thereof into other radiation which may be of various kinds and intensities depending on the presence or absence of certain ingredients in said constituents; exposing to impingement by said other radiation a plurality of closely-grouped-together luminophors having discrete capabilities for converting penetrative radiation into light; and periodically sampling on a time-sharing multiplex basis the light produced by said luminophors to convert characteristics thereof into electrical signals.

References Cited in the file of this patent
UNITED STATES PATENTS

| | | |
|---|---|---|
| 2,351,028 | Fearon | June 13, 1944 |
| 2,467,844 | Michel | Apr. 19, 1949 |
| 2,583,132 | Altar et al. | Jan. 22, 1952 |
| 2,648,012 | Scherbatskoy | Aug. 4, 1953 |

OTHER REFERENCES

"The Detection of Gamma-Rays with Thallium-activated Sodium Iodide Crystals" by Robert Hofstadter, from Physical Review, vol. 75, No. 5, Mar. 1, 1949, pp. 796–798.

"A Scintillation Counter for Thermal Neutrons" by James E. Draper, from Review of Scientific Instruments, vol. 22, No. 7, July 1951, p. 543.